(12) United States Patent
Banzhaf et al.

(10) Patent No.: US 11,091,157 B2
(45) Date of Patent: Aug. 17, 2021

(54) METHOD AND SYSTEM FOR ASCERTAINING AN EXPECTED DEVICE CONTOUR

(71) Applicant: Robert Bosch GmbH, Stuttgart (DE)

(72) Inventors: Holger Andreas Banzhaf, Laichingen (DE); Maxim Dolgov, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 16/401,207

(22) Filed: May 2, 2019

(65) Prior Publication Data

US 2019/0344785 A1 Nov. 14, 2019

(30) Foreign Application Priority Data

May 14, 2018 (DE) .......................... 102018207421.6

(51) Int. Cl.
*B60W 30/095* (2012.01)
*G05D 1/02* (2020.01)
(Continued)

(52) U.S. Cl.
CPC ........ *B60W 30/0953* (2013.01); *B25J 9/1676* (2013.01); *B60W 40/10* (2013.01);
(Continued)

(58) Field of Classification Search
CPC combination set(s) only.
See application file for complete search history.

(56) References Cited

U.S. PATENT DOCUMENTS 9,568,915 B1\* 2/2017 Berntorp ............. B60W 30/095
2008/0312833 A1\* 12/2008 Greene .................. G08G 1/165
701/301

(Continued)

OTHER PUBLICATIONS

Holger Banzhaf, Maxim Dolgov, Jan Stellet, J. Marius Zöllner; "From Footprints to Beliefprints: Motion Planning under Uncertainty for Maneuvering Automated Vehicles in Dense Scenarios"; Nov. 4, 2018; 2018 International Conference on Intelligent Transportation Systems; 21st; pp. 1680-1687 (Year: 2018).\*

*Primary Examiner* — Jeff A Burke
*Assistant Examiner* — Zachary Joseph Wallace
(74) *Attorney, Agent, or Firm* — Norton Rose Fulbright Us LLP; Gerard Messina

(57) ABSTRACT

A method for ascertaining an expected contour of a mobile or stationary device for avoiding collisions, using at least one control unit that is internal external to the device includes: obtaining a movement trajectory of the device, which contains probability densities based on state estimation, at least based on expected values and covariances; obtaining a base polyhedron and an approximate contour of the device having a limited number of corners, a confidence interval within which a collision with the static and dynamic surroundings of the device is to be avoided being defined; transforming the base polyhedron to the at least one probability density of the movement trajectory that describes the state estimation; and, for each corner of the transformed base polyhedron, computing a transformed device contour, and ascertaining the expected contour of the device with inclusion of all transformed device contours.

9 Claims, 4 Drawing Sheets

(51) Int. Cl.
    *G05D 1/10*     (2006.01)
    *B25J 9/16*     (2006.01)
    *B60W 40/10*     (2012.01)
    *B60W 50/00*     (2006.01)
    *G05D 1/00*     (2006.01)

(52) U.S. Cl.
    CPC ....... *B60W 50/0097* (2013.01); *G05D 1/0088* (2013.01); *G05D 1/0214* (2013.01); *G05D 1/106* (2019.05); *B60W 2050/002* (2013.01); *G05D 1/0206* (2013.01); *G05D 2201/0213* (2013.01)

(56) References Cited

U.S. PATENT DOCUMENTS

2019/0016339 A1*   1/2019   Ishioka ................ G05D 1/0223
2020/0189574 A1*   6/2020   Vignard ................ B60W 30/09

* cited by examiner

METHOD AND SYSTEM FOR ASCERTAINING AN EXPECTED DEVICE CONTOUR

CROSS-REFERENCE TO RELATED APPLICATIONS

The present application claims priority under 35 U.S.C. § 119 to DE 10 2018 207 421.6, filed in the Federal Republic of Germany on May 14, 2018, the content of which is hereby incorporated by reference herein in its entirety.

FIELD OF THE INVENTION

The present invention relates to a method for ascertaining an expected contour of a mobile or stationary device for avoiding collisions in the probabilistic sense, using at least one control unit that is internal to the device or external to the device. Moreover, the present invention relates to a system for carrying out such a method.

BACKGROUND

Due to the complexity of motion planning for automated devices and in particular vehicles that compute a path or a trajectory, the motion planning often takes place without taking into account the system, localization, and perception uncertainties.

However, in order to increase the robustness and reliability of the overall system it is necessary to consider these uncertainties. Methods are already known that compute not only the planned expected path or trajectory, but also the associated covariances, so that the distributions, which in this case are Gaussian distributions, of the vehicle state about the expected trajectory (so-called "beliefs") are taken into account. To ensure with a predefined confidence that the vehicle or the device does not collide with the surroundings, the collision check must incorporate the computed covariances.

One option is to take samples of individual device or vehicle configurations from the distribution of the vehicle state along the expected trajectory, and for each of these samples, to check a transformed "footprint," i.e., the footprint of the vehicle, together with the surroundings with regard to a collision. The footprint of the vehicle or of a device is a device or vehicle contour that is projected onto the xy plane or the surface underlying the device or the vehicle.

In carrying out collision checks, for example for a "no collision" confidence of 97% that is to be met in 99% of the cases, more than $10^3$ collision checks per uncertain vehicle state must be carried out. For motion planning with real-time requirements, such computations are time-consuming and impose high demands on the performance capacity of the control units.

In addition, the concept of so-called "sigma hulls" is known, in which a Gaussian distribution of the uncertainties is assumed. Based on the sigma points of a so-called unscented Kalman filter, a convex hull of the footprint transformed onto the sigma points is computed, which is checked for possible collisions. For example, for an automated vehicle having a three-dimensional state that is defined by the position in the x and y directions and an orientation of the vehicle, seven sigma points can be ascertained. Although this approach is computationally more favorable than sampling $10^3$ configurations, information concerning "no collision" confidence can no longer be ensured.

SUMMARY

An object underlying the present invention can be regarded as providing a method for rapidly computing a device contour in an expected device configuration, in particular for a collision check.

According to one aspect of the present invention, a method for ascertaining an expected contour of a mobile or stationary device for avoiding collisions using at least one control unit that is internal to the device or external to the device is provided.

In one step, a movement trajectory of the device that contains probability densities based on state estimation, at least using expected values and covariances, is computed by a user or by the at least one control unit. The probability densities can be defined by average values and/or covariances, for example.

In addition, a base polyhedron and an approximate contour of the device having a limited number of corners are determined by a user or by automated means.

A confidence interval within which a collision with the static and dynamic surroundings of the device is to be avoided is subsequently defined.

In a further step, the at least one control unit transforms the base polyhedron to the at least one probability density of the movement trajectory that describes the state estimation.

For each corner of the transformed base polyhedron, a transformed device contour is computed by the at least one control unit, and the expected contour of the device is ascertained, with inclusion of all transformed device contours.

According to another aspect of the present invention, a system for carrying out the method according to the present invention is provided.

Rapid computation of a so-called "belief print" can be achieved by the method according to the present invention. The belief print is a surface projected onto a surface underlying the device, and which is covered, with a Gaussian covariance, for example, by the contour of the device in the expected vehicle configuration. The term "belief print" is derived from a footprint of the device contour. However, the belief print takes into account, at least in part, system, localization, and perception uncertainties, and thus has a larger design than a typical footprint of a device contour, and has a surface which, in an uncertain device state along the movement trajectory, is determined by the covariance, for example.

Such a belief print can then be checked, during an existing collision check, for a collision with the static and dynamic surroundings of the device.

The device can be a stationary or a mobile device. For example, the device can be an autonomous or semiautonomous vehicle, an automatic transporter, an automated aircraft, watercraft, and the like. A stationary device can be, for example, a manipulator, a robot or robot arm, a transport device, and the like. Another field of application can be in the area of so-called highly automated parking. For example, the method can be carried out by an external or internal control unit of the device.

The method according to the present invention can in particular provide the following advantages:

Simple and rapid computation of the belief print. By use of currently available computer hardware, the belief print can be ascertained in approximately 5 μs for a vehicle contour having 4 corners and a base polyhedron having 12 corners, and in approximately 17 μs for a vehicle contour having 20 corners and a base polyhedron having 12 corners.

Strict and robust adherence to a predefined confidence is provided by the method for a state that is represented by a Gaussian probability density.

The method according to the present invention is transferable without limitation from 3D, an uncertain 2D position, or orientation of the device to 2D, 4D, and further dimensions or degrees of freedom.

No non-correlation assumptions are made, so that the entire uncertainty range, i.e., all relevant uncertainties, is/are taken into account.

According to an example embodiment of the method, the expected contour of the device is formed from a surface that is spanned by all transformed device contours. The belief print is thus defined or "spanned" by all states that are taken into account. The base polyhedron can be transformed, for example, to any covariance of the trajectory. Each corner of the base polyhedron represents a possible device configuration or device state to which the footprint or the contour of the device is transformed. Lastly, for example, a convex hull is formed over all transformed footprints in order to obtain the final belief print. However, the contour is not limited to a two-dimensional shape, and can also be three-dimensional. In particular for an aircraft, a volume instead of a surface can be advantageous in forming the expected contour.

According to another example embodiment of the method, the base polyhedron having the specified number of corners is determined by integrating the standard normal distribution over the volume of the base polyhedron in such a way that the predefined confidence interval is met. For example, for a vehicle having a three-dimensional state, the base polyhedron is determined by integrating a three-dimensional standard normal distribution over the volume of the base polyhedron in such a way that the probability mass enclosed by the base polyhedron corresponds to the predefined confidence interval. In this way, a defined confidence can be taken into account and met in the computation of the belief print, thus increasing the reliability of the collision check.

According to another example embodiment of the method, the transformation of the base polyhedron to the probability density of the movement trajectory which describes the state estimation and which is given at least by an average value and a covariance, is carried out by a decomposition of the covariance, multiplication of each corner of the base polyhedron by a decomposition of the covariance, and addition of an expected value of a vehicle contour to each corner of the base polyhedron. The decomposition can be, for example, a Cholesky decomposition, a quadratic decomposition such as a matrix square root decomposition, a singular value decomposition, an eigenvalue decomposition, and the like.

According to another example embodiment of the method, the expected contour of the device is transmitted by the at least one control unit to a collision check unit of the device. The expected contour can be configured as the belief print of the device. The transmission preferably takes place via a connection that is internal to the device or via a communication link that is external to the device. The collision check unit can thus be situated outside or inside the device.

According to another example embodiment of the method, the movement trajectory of the device with the probability densities that describe a state, the base polyhedron and the approximate contour of the device having the limited number of corners, and the confidence interval within which a collision with the static and dynamic surroundings of the device is to be avoided, are ascertained in advance or offline. In this way, at least a portion of the relevant computations for ascertaining the belief print or the expected contour can already be carried out prior to an action of the device, for example by the internal or external control unit. The performance capacity of the control unit for the portion of the computation to be carried out online can thus be lower, and the control unit can thus have a more cost-effective design.

According to another example embodiment of the method, the transformation of the base polyhedron to at least one probability density of the movement trajectory, a transformation of the at least one device contour to each corner of the transformed base polyhedron, and the computation of the expected contour of the device are carried out in situ or online with inclusion of all transformed device contours. By use of this measure, a second portion of the computations for ascertaining the expected contour can be carried out in situ. In particular, the expected contour can thus be ascertained under realistic conditions, taking into account the uncertainty of the vehicle state.

According to another example embodiment of the method, the device is a mobile or stationary robot, a vehicle, or an aircraft, and includes at least one control unit. The method according to the present invention can be used in various mobile or stationary devices.

In particular, devices that have a variable contour or a variable footprint, such as manipulator robots, vehicles with charging and discharging units, and the like can profit from the precise, rapid computation of the expected contour and can take the surroundings into account, free of collisions.

According to another example embodiment of the method, the movement trajectory of the device has at least one translatory degree of freedom and/or at least one rotatory degree of freedom. Thus, in particular for mobile devices, the method can incorporate the relevant degrees of freedom or possible states of the device for computing the expected contour of the device.

Preferred example embodiments of the present invention are explained in greater detail below with reference to greatly simplified schematic illustrations.

DETAILED DESCRIPTION

Figure 1:
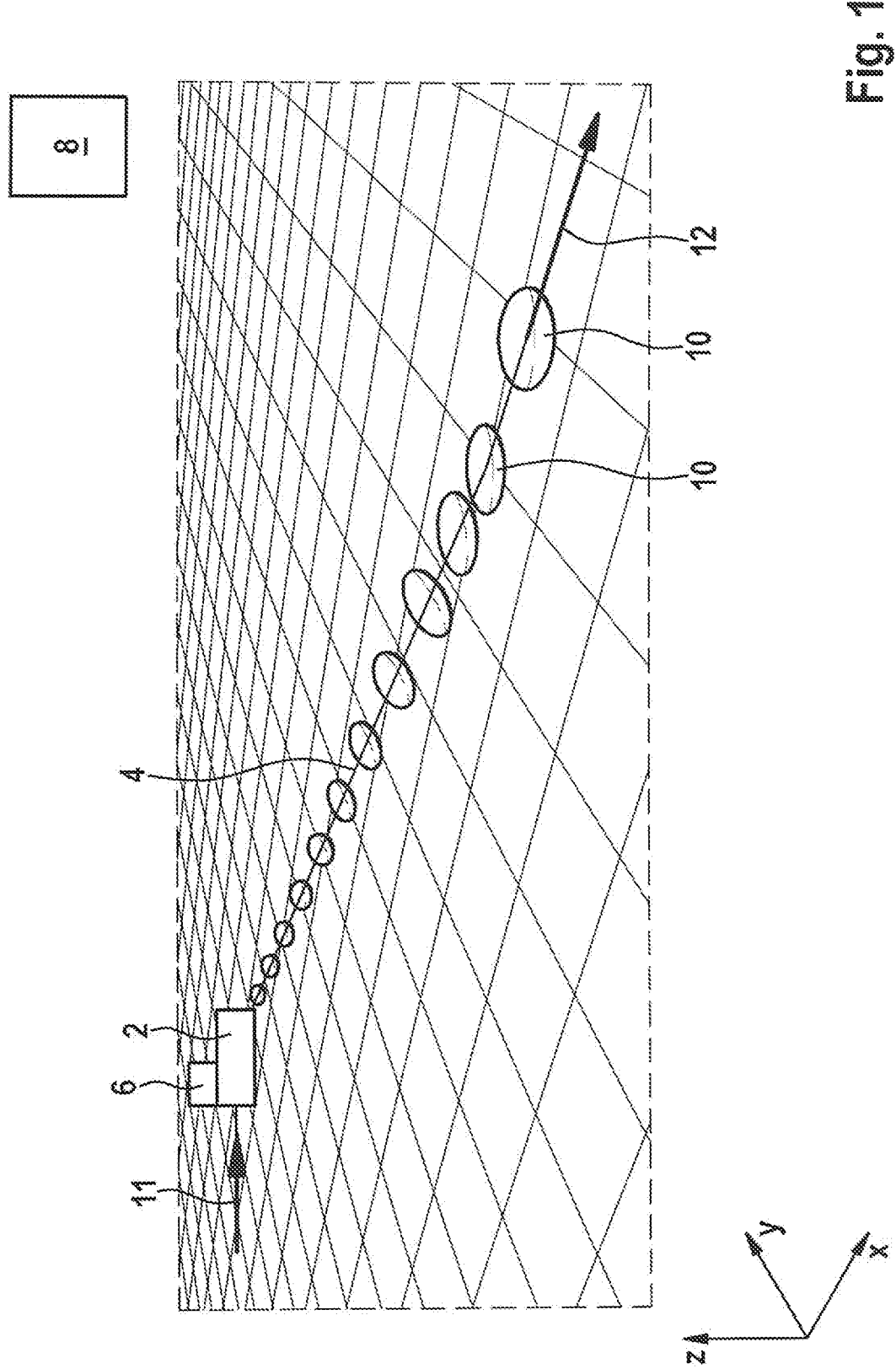
FIG. 1 is a schematic illustration of a system with a movement trajectory of a device, with three-dimensional uncertainties in the form of ellipsoids, according to an example embodiment of the present invention.

In the figures, the same design elements in each case have the same reference numerals. The method according to the present invention is explained below, based on the figures. Device 2 is a mobile device by way of example, and in particular is designed as a vehicle. The steps illustrated in FIGS. 1-4 are carried out, for example, offline or before vehicle 2 starts to travel. In the steps illustrated in FIGS. 5 and 6, the computation takes place online or during planning or while traversing a movement trajectory 4.

FIG. 1 shows a schematic illustration of a system. The system includes a device 2 or a vehicle 2 with an internal control unit 6. A movement trajectory 4 has been ascertained for vehicle 2. The system includes an external control unit 8 that can communicate with vehicle 2 via a communication link. Ascertained movement trajectory 4 of device 2 includes probability densities 10 that describe the state of device 2.

Probability densities 10 are location-dependent, and are illustrated as ellipsoids by way of example. In particular, ellipsoids 10 represent uncertainties in the x and y directions. The z component of the ellipsoids indicates the uncertainty in the orientation of vehicle 2. The orientation of vehicle 2 can be regarded as a rotatory degree of freedom theta. The method can be transferred to higher or lower dimensions or degrees of freedom without limitations.

Movement trajectory 4 begins at a start position 11 and ends at an end position 12.

The starting position of the method is a computed movement trajectory 4 with covariance, which are to be checked for collisions. The belief print can now be computed for each vehicle pose with uncertainty, for example 10 cm discretization of the path, as follows.

Figure 2:
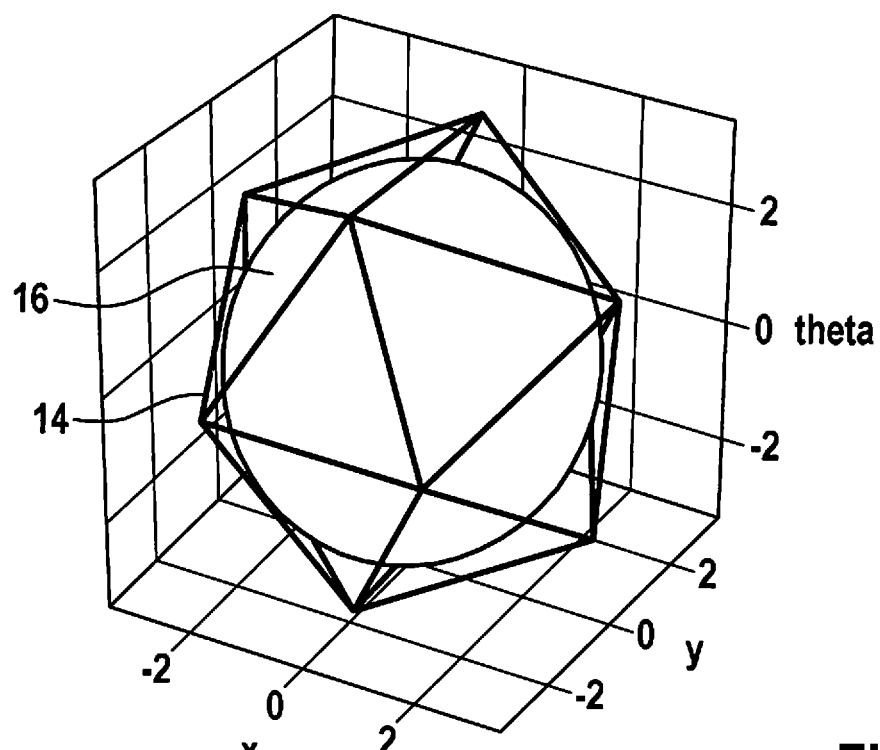
FIG. 2 is a perspective illustration of a base polyhedron, according to an example embodiment of the present invention.

A user initially selects a base polyhedron 14. Such a base polyhedron 14 is illustrated in FIG. 2. By use of base polyhedron 14, an n-dimensional standard normal distribution is approximated, where n corresponds to the number of vehicle states, for example displayed in three dimensions as a sphere 16. Polyhedrons having few corners are particularly suited, since the computing time increases linearly with the number of corners. For example, platonic bodies, fullerenes, Archimedean bodies, Goldberg polyhedrons, and the like are particularly well suited. In the following discussion, the icosahedron has been selected from the platonic bodies as an example, since, with only twelve corners, it approximates a sphere 16 fairly well.

Figure 3:
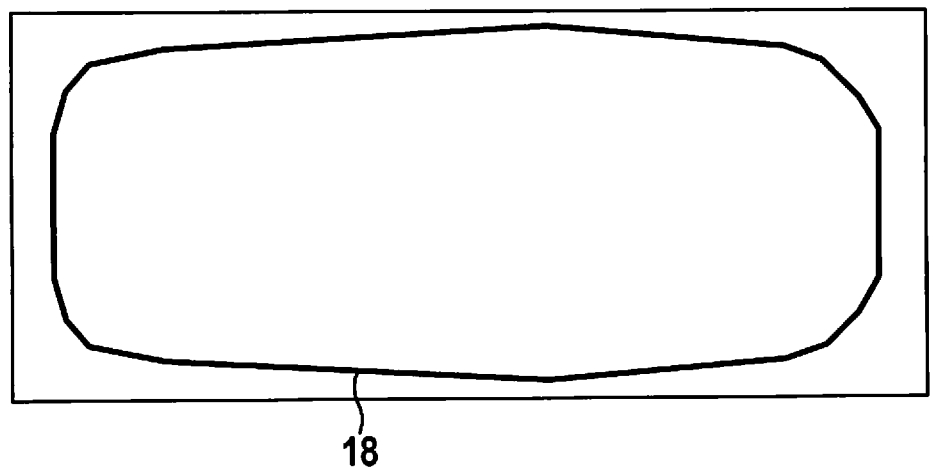
FIG. 3 is an illustration of an approximate contour of the device, according to an example embodiment of the present invention.
Figure 4:
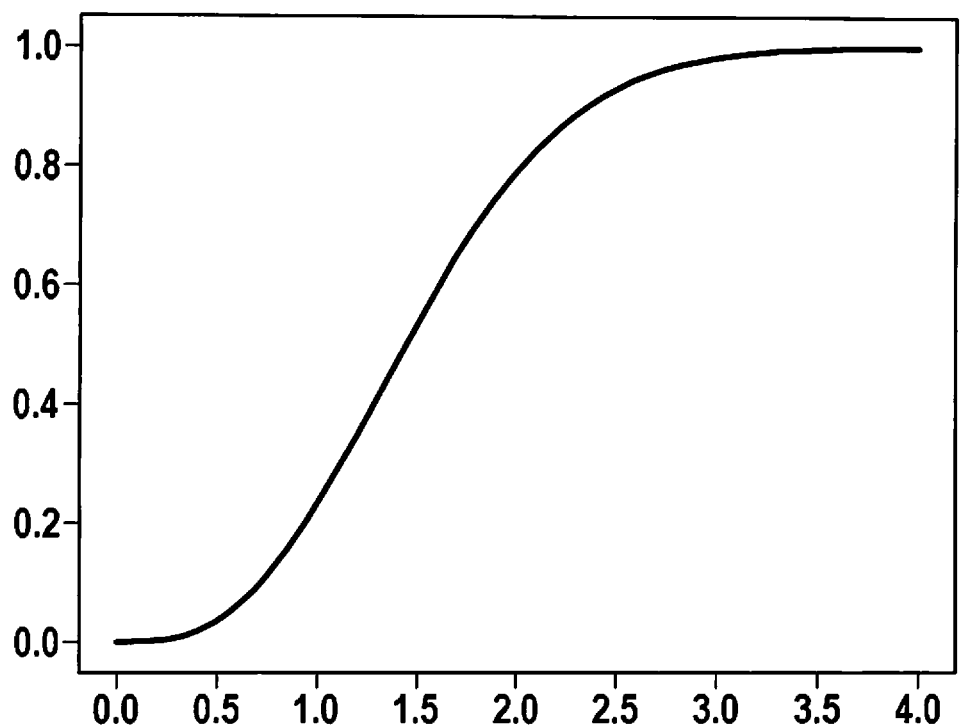
FIG. 4 is a schematic illustration of an enclosed probability mass of the base polyhedron as a function of the inner radius of the base polyhedron, according to an example embodiment of the present invention.

In the next step, the user specifies the confidence that is to be guaranteed for which no collision is present. For a vehicle having three states, this confidence corresponds to the probability mass of a 3D standard normal distribution which selected polyhedron 14 is to enclose as a function of a characteristic geometric size of the polyhedron (for example, an insphere radius or edge length). According to FIG. 4, the probability mass is computed from the integral of the standard normal distribution over the volume of polyhedron 14. In particular, FIG. 4 shows a schematic illustration of an enclosed probability mass of base polyhedron 14 as a function of an inner radius of base polyhedron 14. The associated coordinates of the corners of base polyhedron 14 for the predefined confidence are stored for the online computation. In addition, the user considers a meaningful approximation of the vehicle contour by a polygon, which is depicted in FIG. 3. The computing time increases linearly with the number of corners. In the following discussion, an approximate contour 18 of device 2 is approximated by a polygon having twenty corners.

Figure 5:
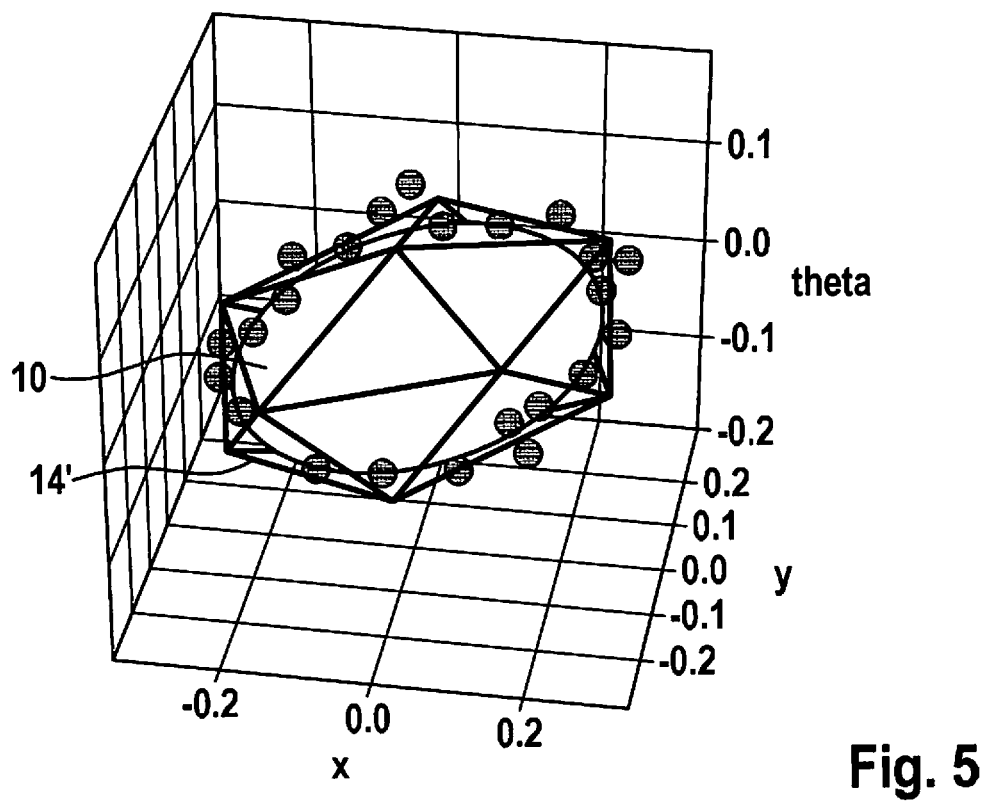
FIG. 5 is a perspective illustration of a transformed base polyhedron and the associated uncertainty in the form of an ellipsoid, according to an example embodiment of the present invention.

FIG. 5 shows a perspective illustration of a transformed base polyhedron 14'. The transformation takes place online or in situ. The points represent samples from the uncertainty for the qualitative check. Since the selected confidence in FIG. 5 is less than one, some samples are outside transformed base polyhedron 14.

Base polyhedron 14 from the previous step is transformed to each covariance of movement trajectory 4. This takes place, for example, via a Cholesky decomposition of the covariance (or alternatively, via a quadratic decomposition such as matrix square root decomposition, singular value decomposition, eigenvalue decomposition, and the like), multiplication of each corner of base polyhedron 14 by the decomposition of the covariance, and addition of the expected value of the vehicle pose to each corner of base polyhedron 14.

Each corner of the polyhedron now represents a vehicle configuration (x position, y position, theta, or orientation) to which expected device contour 18 from FIG. 3 is transformed.

Figure 6:
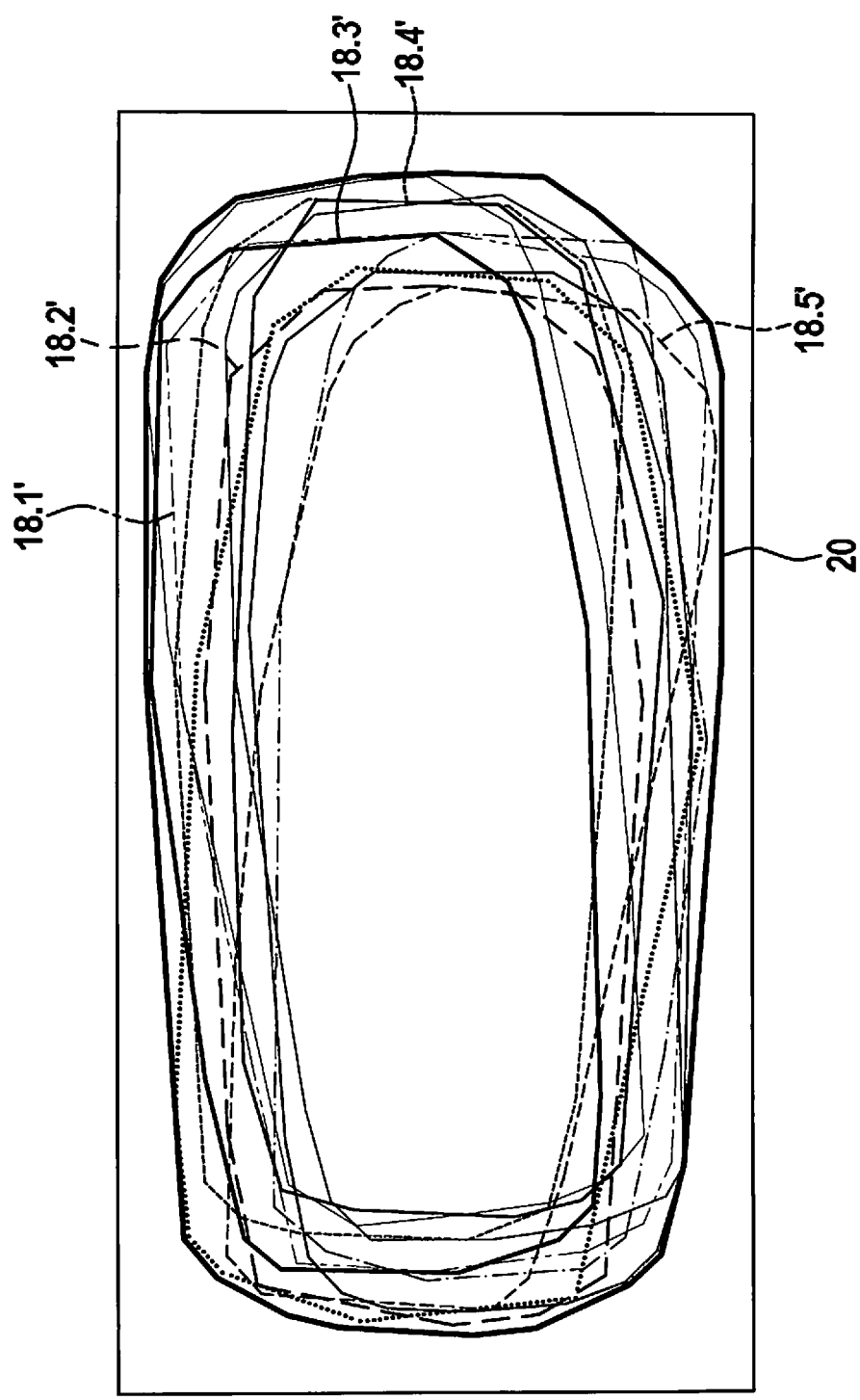
FIG. 6 is a schematic illustration of an expected contour and possible contours of the device, according to an example embodiment of the present invention.

Lastly, a convex hull 20 is formed over all transformed footprints 18.1', 18.2', 18.3', 18.4', 18.5' to obtain final belief print 20. This is depicted in FIG. 6.

Since a rotation involves nonlinear mapping, only for a polyhedron having an infinite number of corners can it be ensured that the predefined confidence from the offline computation is exactly met. However, in the motion planning for vehicles, the variance of the orientation is usually very small (also see FIG. 1), for which reason this effect is generally negligible (a small-angle approximation then results in linear mapping, even for rotation).

The approach can also be expanded in such a way that the confidence is always conservatively met. This can be shown, for example, when the probability distributions of the orientation and the x, y positions are independent. An expansion for correlation is likewise possible.

What is claimed is:

1. A method for ascertaining an expected contour of a mobile or stationary device, which is an automated vehicle, for avoiding a collision of the vehicle, the method comprising:
    obtaining a movement trajectory of the device, wherein the movement trajectory is based on at least expected values and covariances;
    selecting a base polyhedron and an approximate contour of the device each having a limited number of corners;
    transforming the base polyhedron to provide a transformed base polyhedron and to at least one probability density of the movement trajectory, the at least one probability density describing a state estimation;
    determining, for each corner of the transformed base polyhedron, a transformed device contour;
    ascertaining the expected contour of the device based on a combination of all of the transformed device contours; and
    using, via at least one control unit, the expected contour to avoid collision of the vehicle;
    wherein the method is performed by the at least one control unit that is internal or external to the device, and wherein one of the following is satisfied:
    (i) the transforming of the base polyhedron to provide the transformed base polyhedron includes integrating a standard normal distribution over a volume of the base polyhedron in a manner by which a predefined confidence interval, within which a collision with static and dynamic surroundings of the device is to be avoided, is met, or (ii) the transforming of the base polyhedron to provide the transformed base polyhedron includes a decomposition of the covariances, a multiplication of each corner of the base polyhedron by a decomposition, and an addition of an expected value of the expected values of the probability density to each other of the base polyhedron.

2. The method of claim 1, wherein the expected contour of the device is formed from a surface or a volume that is spanned by all of the transformed device contours.

3. The method of claim 1, further comprising transmitting the expected contour of the device to a collision check unit of the device.

4. The method of claim 1, wherein the device is a mobile or stationary robot, a vehicle, or an aircraft, and includes the at least one control unit.

5. The method of claim 1, wherein the movement trajectory has at least one translatory degree of freedom.

6. The method of claim 1, wherein the movement trajectory has at least one rotatory degree of freedom.

7. A method for ascertaining an expected contour of a mobile or stationary device, which is an automated vehicle, for avoiding a collision of the vehicle, the method comprising:
obtaining a movement trajectory of the device, wherein the movement trajectory is based on at least expected values and covariances;
selecting a base polyhedron and an approximate contour of the device each having a limited number of corners;
transforming the base polyhedron to provide a transformed base polyhedron and to at least one probability density of the movement trajectory, the at least on probability density describing a state estimation;
determining, for each corner of the transformed base polyhedron, a transformed device contour;
ascertaining the expected contour of the device based on a combination of all the transformed device contours; and
using, via at least on control unit, the expected contour to avoid a collision of the vehicle;
wherein the method is performed by the at least one control unit that is internal or external to the device, and
wherein the movement trajectory with the probability density, the base polyhedron, the approximate contour, and a confidence interval, within which a collision with static and dynamic surroundings of the device is to be avoided, are ascertained in advance or offline.

8. A method for ascertaining an expected contour of a mobile or stationary device, which is an automated vehicle, for avoiding a collision of the vehicle, the method comprising:
obtaining a movement trajectory of the device, wherein the movement trajectory is based on at least expected values and covariances;
selecting a base polyhedron and an approximate contour of the device each having a limited number of corners;
transforming the base polyhedron to provide a transformed base polyhedron and to at least one probability density of the movement trajectory, the at least on probability density describing a state estimation;
determining, for each corner of the transformed base polyhedron, a transformed device contour;
ascertaining the expected contour of the device based on a combination of all the transformed device contours; and
using, via at least on control unit, the expected contour to avoid a collision of the vehicle;
wherein the method is performed by the at least one control unit that is internal or external to the device, and
wherein the transformation, the determination of the at least one transformed device contour, and the ascertainment of the expected contour are carried out in situ or online with inclusion of all of the at least one transformed device contour.

9. A system for ascertaining an expected contour of a mobile or stationary device, which is an automated vehicle, for avoiding a collision of the vehicle, comprising:
at least one control unit, which is internal or external to the device, configured to perform the following:
obtaining a movement trajectory of the device, wherein the movement trajectory is based on at least expected values and covariances;
obtaining a base polyhedron and an approximate contour of the device each having a limited number of corners;
transforming the base polyhedron to at least one probability density of the movement trajectory, the at least one probability density describing a state estimation;
determining, for each corner of the transformed base polyhedron, a transformed device contour;
ascertaining the expected contour of the device based on a combination of all of the transformed device contours; and
using, via the at least one control unit, the expected contour to avoid a collision of the vehicle;
wherein one of the following is satisfied:
(i) the transforming of the base polyhedron to provide the transformed base polyhedron includes integrating a standard normal distribution over a volume of the base polyhedron in a manner by which a predefined confidence interval, within which a collision with static and dynamic surroundings of the device is to be avoided, is met, or
(ii) the transforming of the base polyhedron to provide the transformed base polyhedron includes a decomposition of the covariances, a multiplication of each corner of the base polyhedron by a decomposition, and an addition of an expected value of the expected values of the probability density to each corner of the base polyhedron.

* * * * *